(12) United States Patent
Cheng et al.

(10) Patent No.: US 8,386,295 B2
(45) Date of Patent: Feb. 26, 2013

(54) CHECKING THE CORRECTNESS OF GIS DATA

(75) Inventors: Honesty Young Cheng, Saratoga, CA (US); Jin Dong, Beijing (CN); Ming Xie, Beijing (CN); Wen Jun Yin, Beijing (CN); Bin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 12/349,096

(22) Filed: Jan. 6, 2009

(65) Prior Publication Data

US 2009/0187447 A1 Jul. 23, 2009

(30) Foreign Application Priority Data

Jan. 8, 2008 (CN) .......................... 2008 1 0001770

(51) Int. Cl.
*G06Q 10/00* (2012.01)
(52) U.S. Cl. ..................... 705/7.34; 705/7.11
(58) Field of Classification Search .......................... None
See application file for complete search history.

(56) References Cited

U.S. PATENT DOCUMENTS

| | | | |
|---|---|---|---|
| 2002/0002552 A1* | 1/2002 | Schultz et al. .................... 707/3 |
| 2002/0188507 A1 | 12/2002 | Busche | |
| 2003/0046138 A1 | 3/2003 | Cary et al. | |
| 2003/0061211 A1* | 3/2003 | Shultz et al. ....................... 707/3 |
| 2005/0251331 A1* | 11/2005 | Kreft .............................. 701/207 |
| 2006/0287810 A1* | 12/2006 | Sadri et al. ..................... 701/200 |
| 2007/0009156 A1* | 1/2007 | O'Hara et al. ................ 382/190 |
| 2008/0005674 A1* | 1/2008 | Wattenberg et al. .......... 715/730 |
| 2009/0076888 A1* | 3/2009 | Oster et al. ...................... 705/10 |

FOREIGN PATENT DOCUMENTS

| KR | 3062990 A | 7/2003 |
|---|---|---|
| WO | WO 03003243 A2 * | 1/2003 |

OTHER PUBLICATIONS

Qinghui Sun, et al., "Application of the Attribute Recognition Method for the Evaluation of Spatial Data Quality", Proc. of SPIE, vol. 6420, (2006).

* cited by examiner

*Primary Examiner* — Faris Almatrahi
(74) *Attorney, Agent, or Firm* — Jon A. Gibbons; Fleit Gibbons Gutman Bongini & Bianco PL (57) ABSTRACT

A method and apparatus for checking the correctness of GIS data. The method includes the steps of: receiving GIS data; receiving business data of each branch; determining the geographic area to which each branch belongs, wherein the GIS data in the geographic area will be checked; and, checking whether the GIS data of the geographic area to which each branch belongs are correct based on the business data of each branch. The method and apparatus can automatically check geographic and demographic data of a given city or region.

13 Claims, 9 Drawing Sheets

| POI Type | Demographical Attribute | | |
|---|---|---|---|
| China Construction Bank | Branch type | Operation duration | Operation area |
| Bank of China | Branch type | Operation duration | Operation area |
| China Agricultural Bank | Branch type | Operation duration | Operation area |
| China Industrial and Commercial Bank | Branch type | Operation duration | Operation area |
| Other commercial bank | Branch type | Operation duration | Operation area |
| University and college | School duration | Number of faculty | Number of students |
| Residential area | House duration | Building average price | Number of residents |
| Office building | Operation duration | Sales area | Rent |
| Hotel | Operation duration | Star level | Number of rooms |
| Emporium | Operation duration | Operation area | Number of stores |
| Supermarket | Operation duration | Operation area | |
| Store | Operation duration | Operation area | |
| Hospital | Operation duration | Rating | Operation area |
| Restaurant | Operation duration | Star level | Operation area |
| Recreation facility | Operation duration | Operation area | |
| Company, enterprise and factory | Operation duration | Number of employee | Registered capital |
| Railway station | Operation duration | Operation area | |
| Coach terminal | Operation duration | Operation area | |
| Bus station | Vehicle number and amount | | |

FIG. 3

| Number | Name | Number of deposit accounts of 2006 | Total amount of deposits of 2006 | Intermediate income of 2006 | Branch daily average trading volume of 2006 |
|---|---|---|---|---|---|
| 4 | XX outlet of XX Bank | 24691 | 13868.89 | 40.17 | 297.46 |
| 5 | XX outlet of XX Bank | 22351 | 22486.00 | 37.91 | 448.42 |
| 6 | XX Saving Office of XX Bank | 20128 | 17171.03 | 32.05 | 285.08 |
| 7 | XX outlet of XX Bank | 15644 | 49046.12 | 33.54 | 529.93 |
| 8 | XX Saving Office of XX Bank | 7199 | 6325.57 | 19.75 | 201.93 |
| 9 | XX outlet of XX Bank | 36670 | 28980.15 | 27.60 | 304.93 |
| 10 | XX Saving Office of XX Bank | 12383 | 11706.37 | 16.10 | 194.79 |
| 11 | XX outlet of XX Bank | 28377 | 26912.95 | 36.42 | 410.56 |
| 12 | XX Saving Office of XX Bank | 11181 | 10849.31 | 45.56 | 254.93 |
| 37 | XX Saving Office of XX Bank | 11361 | 20582.00 | 30.83 | 437.33 |
| 38 | XX outlet of XX Bank | 26515 | 27810.91 | 37.13 | 468.59 |
| 39 | XX outlet of XX Bank | 32219 | 27902.76 | 20.09 | 298.48 |
| 40 | XX Saving Office of XX Bank | 6872 | 9339.08 | 19.48 | 142.98 |
| 41 | XX outlet of XX Bank | 37689 | 32499.03 | 27.08 | 299.34 |
| 42 | XX outlet of XX Bank | 20929 | 24594.53 | 21.92 | 255.51 |
| 43 | XX outlet of XX Bank | 18647 | 21683.23 | 22.85 | 210.33 |
| 44 | XX Saving Office of XX Bank | 22132 | 18885.33 | 23.09 | 244.73 |
| 45 | XX outlet of XX Bank | 3930 | 2398.00 | 19.18 | 83.35 |
| 46 | XX outlet of XX Bank | 17713 | 17113.33 | 23.74 | 218.63 |
| 47 | XX Saving Office of XX Bank | 23229 | 22097.33 | 26.61 | 230.79 |
| 15 | XX outlet of XX Bank | 33142 | 30598.90 | 56.58 | 387.31 |
| 16 | XX outlet of XX Bank | 20165 | 18273.81 | 45.08 | 255.73 |
| 17 | XX Saving Office of XX Bank | 15412 | 21882.14 | 42.08 | 181.84 |
| 18 | XX outlet of XX Bank | 25207 | 21794.96 | 46.24 | 286.70 |
| 19 | XX outlet of XX Bank | 42469 | 21287.74 | 54.66 | 375.67 |
| 20 | XX outlet of XX Bank | 112193 | 56252.32 | 103.92 | 419.52 |
| 21 | XX outlet of XX Bank | 44177 | 23260.49 | 52.81 | 296.76 |
| 22 | XX Saving Office of XX Bank | 18116 | 18662.97 | 54.42 | 294.42 |
| 23 | XX Saving Office of XX Bank | 14875 | 19227.92 | 59.49 | 231.53 |
| 24 | XX outlet of XX Bank | 22878 | 12587.77 | 54.36 | 426.67 |
| 49 | XX outlet of XX Bank | 28306 | 28522.47 | 33.18 | 292.32 |
| 50 | XX outlet of XX Bank | 31905 | 29262.22 | 57.09 | 355.56 |
| 51 | XX outlet of XX Bank | 29704 | 28127.18 | 54.42 | 385.75 |
| 52 | XX Saving Office of XX Bank | 18706 | 20670.66 | 42.67 | 338.05 |
| 53 | XX Saving Office of XX Bank | 13547 | 16941.91 | 89.07 | 156.22 |
| 26 | XX outlet of XX Bank | 24637 | 16397.31 | 44.85 | 440.83 |
| 27 | XX outlet of XX Bank | 32833 | 33902.84 | 44.85 | 399.54 |
| 28 | XX outlet of XX Bank | 30217 | 23265.01 | 38.44 | 362.64 |
| 29 | XX Saving Office of XX Bank | 27604 | 16619.21 | 38.44 | 234.41 |
| 30 | XX outlet of XX Bank | 43408 | 26149.06 | 38.44 | 292.94 |
| 31 | XX outlet of XX Bank | 23679 | 14334.02 | 38.44 | 237.36 |
| 32 | XX Saving Office of XX Bank | 18177 | 17484.44 | 32.04 | 221.80 |

FIG. 4

| POI Type | | | | Demographical attribute | |
| --- | --- | --- | --- | --- | --- |
| China Construction Bank | Name | Latitude X | Longitude Y | Branch type | Operation duration | Operation area |
| Bank of China | Name | Latitude X | Longitude Y | Branch type | Operation duration | Operation area |
| China Agricultural Bank | Name | Latitude X | Longitude Y | Branch type | Operation duration | Operation area |
| China Industrial and Commercial Bank | Name | Latitude X | Longitude Y | Branch type | Operation duration | Operation area |
| Other commercial bank | Name | Latitude X | Longitude Y | Branch type | Operation duration | Operation area |
| University and college | Name | Latitude X | Longitude Y | School duration | Number of faculty | Number of students |
| Residential area | Name | Latitude X | Longitude Y | House duration | Building average price | Number of residents |
| Office building | Name | Latitude X | Longitude Y | Operation duration | Sales area | Rent |
| Hotel | Name | Latitude X | Longitude Y | Operation duration | Star level | Number of rooms |
| Emporium | Name | Latitude X | Longitude Y | Operation duration | Operation area | Number of stores |
| Supermarket | Name | Latitude X | Longitude Y | Operation duration | Operation area | |
| Store | Name | Latitude X | Longitude Y | Operation duration | Operation area | |
| Hospital | Name | Latitude X | Longitude Y | Operation duration | Rating | Operation area |
| Restaurant | Name | Latitude X | Longitude Y | Operation duration | Star level | Operation area |
| Recreation facility | Name | Latitude X | Longitude Y | Operation duration | Operation area | |
| Company, enterprise and factory | Name | Latitude X | Longitude Y | Operation duration | Number of employee | |
| Railway station | Name | Latitude X | Longitude Y | Operation duration | Operation area | Registered capital |
| Coach terminal | Name | Latitude X | Longitude Y | Operation duration | | |
| Bus station | Name | Latitude X | Longitude Y | Vehicle number | | |

FIG. 5

| Name | Latitude | Longitude | Number of deposit accounts | Total amount of deposits | Intermediate income | Branch daily average trading volume |
|---|---|---|---|---|---|---|
| XX outlet of XX Bank | 120.651 | 31.3068 | 24691 | 13868.89 | 40.17 | 297.46 |
| XX outlet of XX Bank | 120.6583 | 31.31988 | 22351 | 22486.00 | 37.91 | 448.42 |
| XX Saving Office of XX Bank | 120.6788 | 31.30645 | 20128 | 17171.03 | 32.05 | 285.08 |
| XX outlet of XX Bank | 120.5613 | 31.29469 | 15644 | 49046.12 | 33.54 | 529.93 |
| XX Saving Office of XX Bank | 120.565 | 31.30381 | 7199 | 6325.57 | 19.75 | 201.93 |
| XX outlet of XX Bank | 120.5757 | 31.30338 | 36670 | 28980.15 | 27.60 | 304.93 |
| XX Saving Office of XX Bank | 120.5786 | 31.26952 | 12383 | 11706.37 | 16.10 | 194.79 |
| XX outlet of XX Bank | 120.508 | 31.3795 | 28377 | 26912.95 | 36.42 | 410.56 |
| XX Saving Office of XX Bank | 120.5871 | 31.29018 | 11181 | 10849.31 | 45.56 | 254.93 |
| XX Saving Office of XX Bank | 120.5909 | 31.29109 | 11361 | 20582.00 | 30.83 | 437.33 |
| XX outlet of XX Bank | 120.5936 | 31.30127 | 26515 | 27810.91 | 37.13 | 468.59 |
| XX outlet of XX Bank | 120.5989 | 31.29898 | 32219 | 27902.76 | 20.09 | 298.48 |

| Name | Navigation | Ranking difference | Result confirmation |
|---|---|---|---|
| Geographic Area 1 | | 30 | Data error |
| Geographic Area 2 | | 23 | Exceptional competition |
| Geographic Area 3 | | 22 | Data error |
| Geographic Area 4 | | 20 | Data error |
| Geographic Area 5 | | 19 | Exceptional competition / Sudden event / To be confirmed / No data error |
| Geographic Area 6 | | 5 | |
| Geographic Area 7 | | 2 | No data error |
| Geographic Area 8 | | 2 | No data error |
| Geographic Area 9 | | 2 | No data error |
| Geographic Area 10 | | 1 | No data error |
| Geographic Area 11 | | 1 | No data error |

CHECKING THE CORRECTNESS OF GIS DATA

CROSS REFERENCE TO RELATED APPLICATION

This application claims priority under 35 U.SW.C. 119 from Chinese Patent Application No. 200810001770.2 filed Jan. 8, 2008, the entire contents of which are incorporated herein by reference.

BACKGROUND OF THE INVENTION

1. Field of the Invention

The present invention relates to the GIS field, and particularly to a method and apparatus for checking the correctness of GIS data.

2. Description of Related Art

GIS (Geographic Information System) data including geographic and demographic data have become more and more important, and have found more and more widespread application in fields such as market analysis applications, facility positioning, urban planning, etc. In most of such cases, a huge amount of GIS data (e.g., over 150,000 records for the city of Beijing) are a foundation to ensure the successes of these applications. However, so far there is no good technical method and tool which can check the huge amount of geographic and demographic data quickly and automatically.

The checking of geographic and demographic data is very important. For an end user, such as a bank or a retailer, data correctness is critical for the quality of quantitative analyses of its GIS system. Therefore, before conducting a quantitative analysis, given geographic and demographic data should be checked carefully to determine whether these data sets are sufficiently complete and correct, thus avoiding incorrect decisions being made based on them. For a vendor of GIS data, the checking of the correctness of the GIS data is one of the most important aspects for increasing its competitiveness and decreasing its labor costs.

Since geographic and demographic data are usually collected and purchased from various channels, such as public or governmental departments or GIS and demographic data vendors, and often belong to different periods, there may exist some incorrect, outdated or inaccurate data therein. However, it is a costly work to check each data source channel and it is very difficult to implement automatic checking of GIS data.

An existing method for checking GIS data is to select certain sampling points and verify the data of these sampling points manually in the field. This kind of method not only is time consuming, laborious and inefficient, but also has insufficient effectiveness and accuracy since the correctness of the data of a few sampling points can not well reflect the correctness of all the GIS data. In addition, this kind of manual checking method in the prior art can only check the GIS data in a city level or a large region level, and can not be used for a more granular checking. For example, if the data on certain sampling points are determined as incorrect, then the GIS data of a whole city or region will be determined as incorrect.

There is needed a technical solution capable of checking the correctness of GIS data more quickly and effectively in the art.

SUMMARY OF THE INVENTION

According to an aspect of the present invention, there is provided a method for checking the correctness of GIS data, including the steps of: receiving GIS data; receiving business data of each branch; determining the geographic area to which each branch belongs, wherein the GIS data in the geographic area will be checked; and, checking whether the GIS data of the geographic area to which each branch belongs are correct based on the business data of each branch.

According to another aspect of the present invention, there is provided an apparatus for checking the correctness of GIS data, including: a data receiving module configured to receive GIS data and receive business data of each branch; a geographic area determiner configured to determine the geographic area to which each branch belongs, wherein the GIS data in the geographic area will be checked; and, a checking module configured to check whether the GIS data of the geographic area to which each branch belongs are correct based on the business data of each branch.

The present invention can check the geographic and demographic data of a given city or region automatically, greatly saving the time and labor costs and increasing the efficiency of data checking.

The present invention can check the correctness of geographic and demographic data in a certain region such as a small geographic area in a city (with an area of about 1 square kilometer), and indicate in which geographic area the geographic and demographic data are incorrect, increasing the granularity of checking for correctness of geographic and demographic data.

BRIEF DESCRIPTION OF THE DRAWINGS

The invention and its preferred embodiments can be better understood from the following detailed description of the illustrative embodiments when read in conjunction with the drawings, in which:

FIG. 4 shows the performance data of branches of a certain bank in 2006;

FIG. 5 shows an example of GIS data formatted by a data formatter according to an embodiment of the present invention;

DETAILED DESCRIPTION OF PREFERRED EMBODIMENTS

The business data of each branch of an enterprise, such as account and deposit data of each bank branch, are intrinsically associated with the geographic and demographic data in the geographic area to which the branch belongs. Therefore, a correlation model between geographic and demographic data and enterprise business data can be established, and thus, if a given geographic and demographic data set and business data of corresponding branches in a certain geographic area do not conform to the correlation model, then it can be determined the data set is incorrect.

Figure 1:
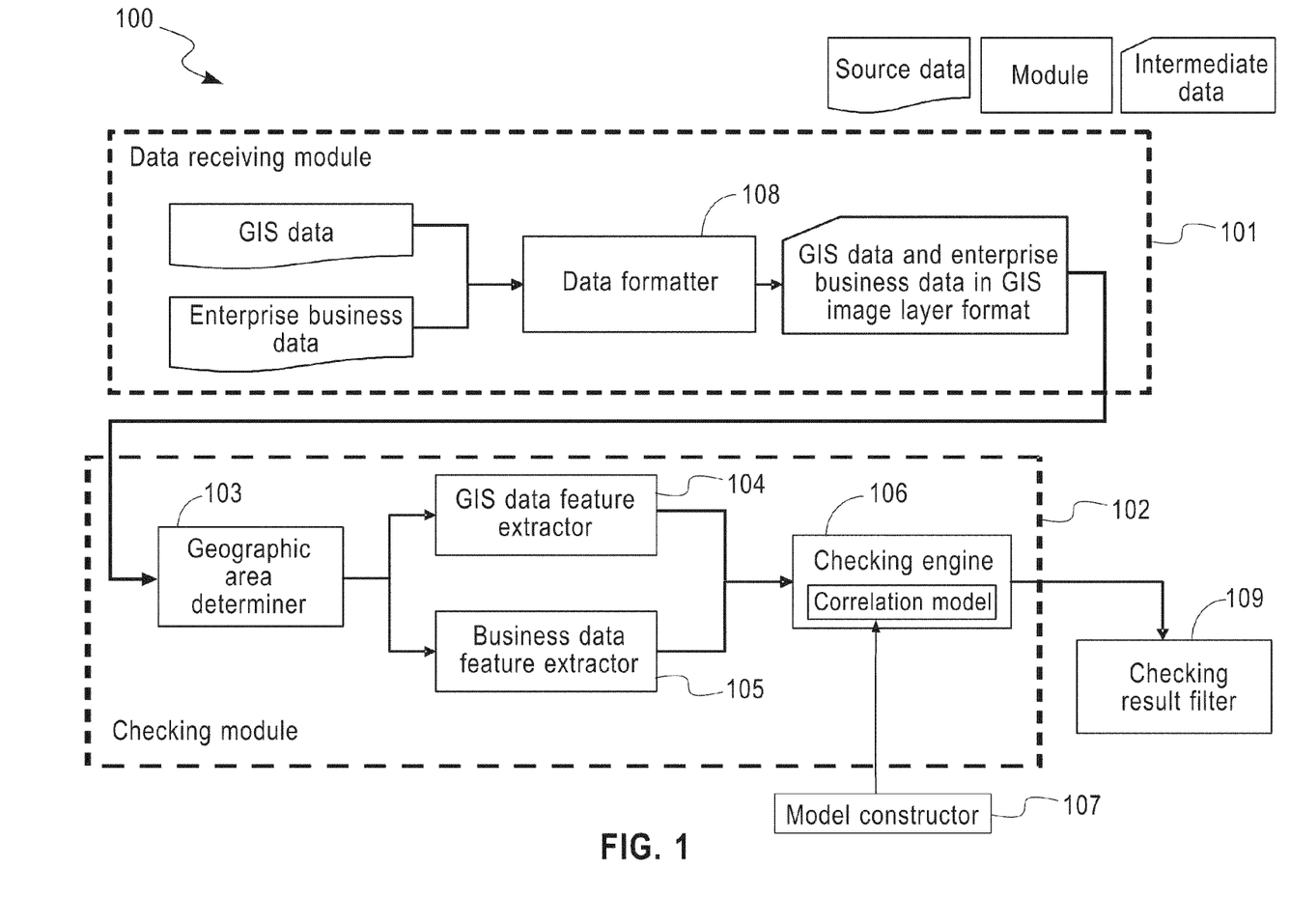
FIG. 1 shows an apparatus for checking the correctness of GIS data according to an embodiment of the present invention.

FIG. 1 shows an apparatus for checking the correctness of GIS data according to an embodiment of the present invention.

As shown in the figure, an apparatus for checking the correctness of GIS data according to an embodiment of the present invention comprises a data receiving module 101 and a checking module 102. The data receiving module 101 is used for receiving GIS data to be checked and for receiving business data of branches of an enterprise. The checking module 102 is used for checking whether the GIS data in the geographic areas to which the branch of the enterprise belongs are correct based on the business data of the branches of the enterprise.

The GIS data may have a plurality of sources, such as carried originally by a GIS system, provided by a GIS data or demographic data vendor, obtained from public or governmental departments or a combination of data obtained from a plurality of sources.

The GIS data includes two parts, geographic data and demographic data, and are usually organized by points of interest (POI). That is, the GIS data includes the location data of POIs and the demographic attribute data of the POIs. POIs include several types, such as branches of other enterprises of the same type, residential areas, office buildings, universities and colleges, emporiums, hotels, hospitals, restaurants, recreation facilities and shops.

Figure 2:
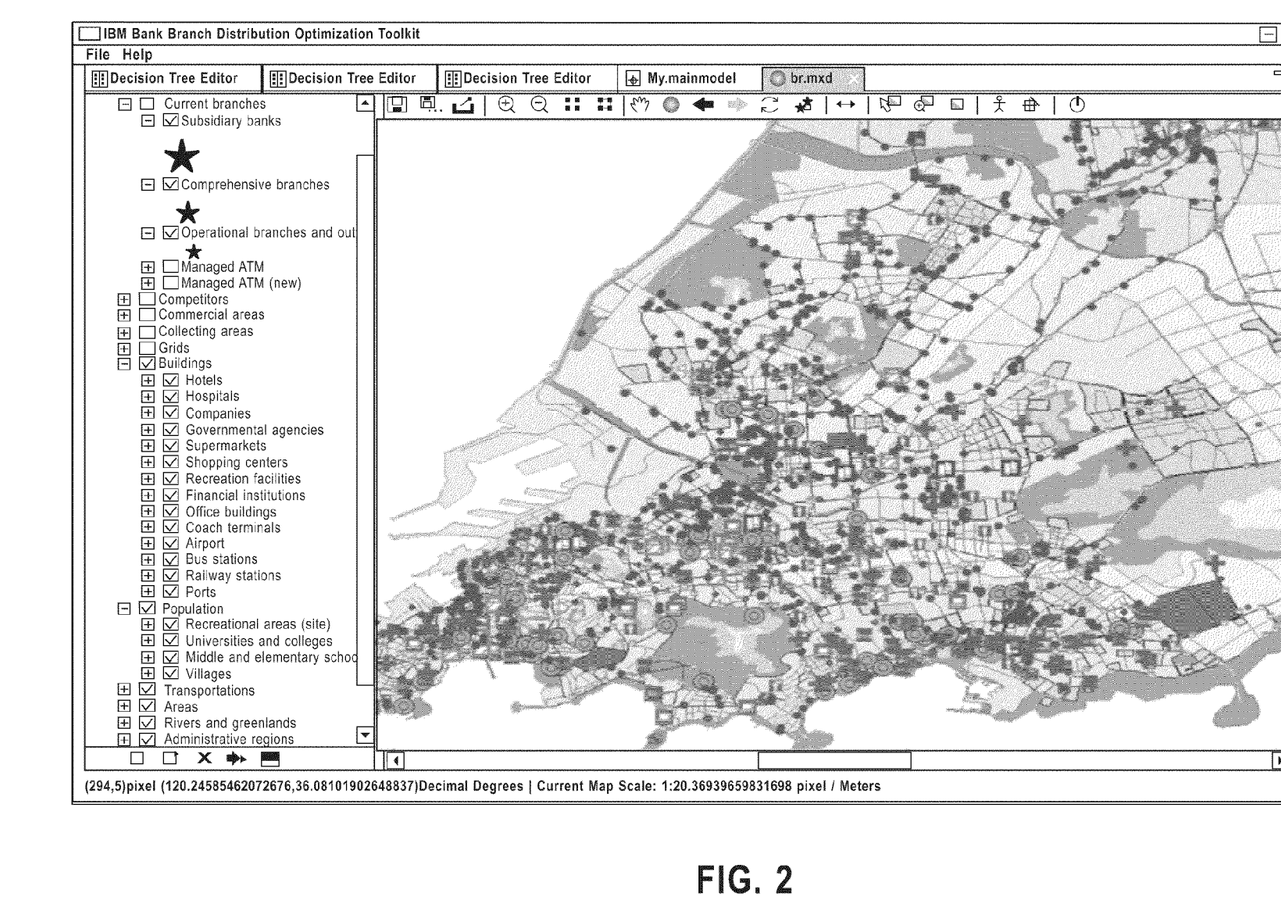
FIG. 2 shows a display interface of an exemplary GIS system.

The POI location data can be represented by the latitudes and longitudes of POIs. FIG. 2 shows a display interface of an exemplary GIS system. The categories of various points of interest are displayed in the left pane of the figure, and the geographic locations in a map for the POIs of the type selected in the left pane of the figure are displayed in the right pane of the figure, where the geographic location of each POI is expressed by a latitude and a longitude inside the system. In the GIS system as shown in FIG. 2, the GIS data of each type of POIs constitute a GIS image layer. Thus, when a certain POI type is selected, the system will display an image layer corresponding to the POI type. When a plurality of POI types are selected, the system will display a plurality of image layers corresponding to the plurality of POI types by superposition.

Figure 3:
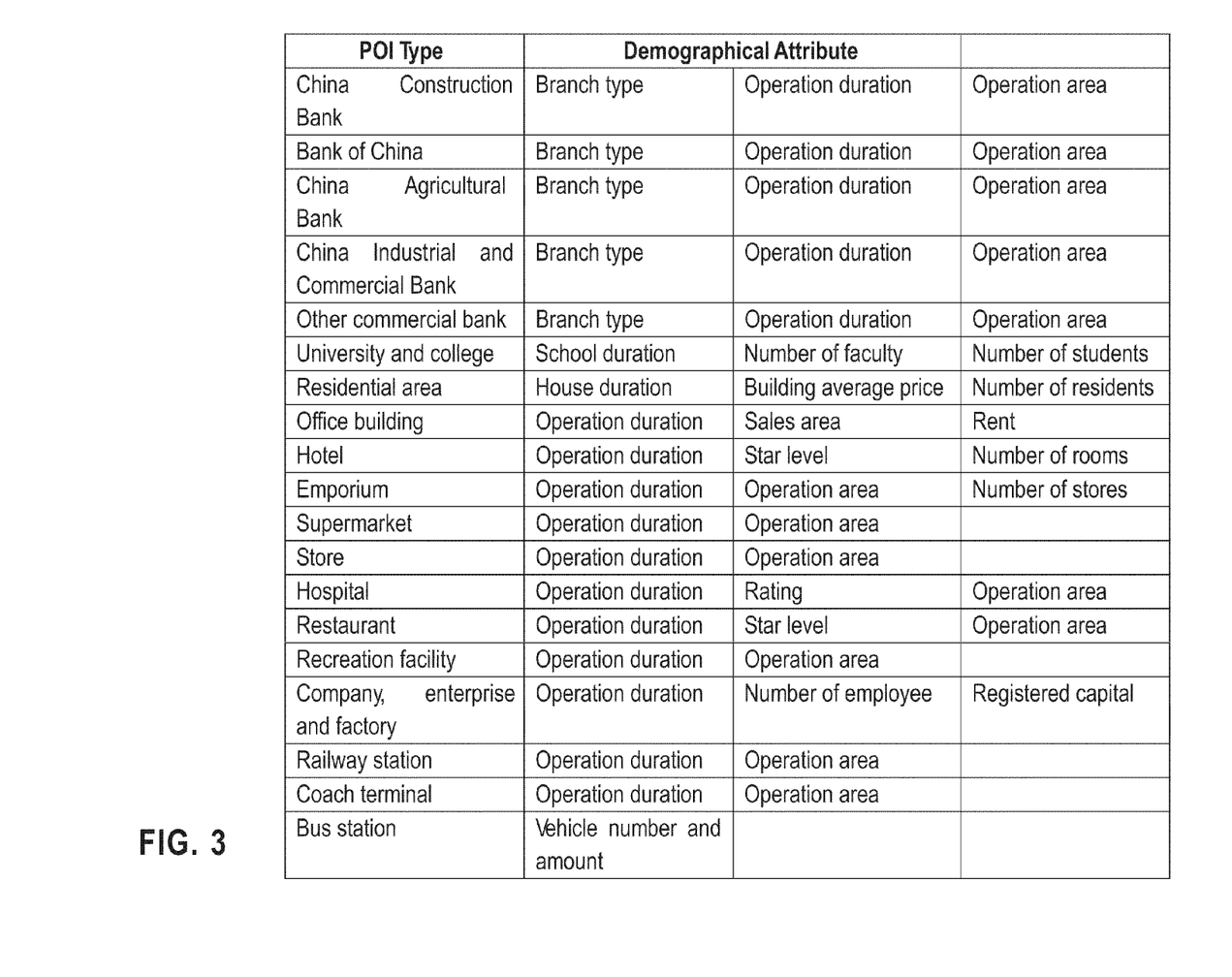
FIG. 3 shows an example of the content of geographic and demographic data.

The demographic data for different POI types are somewhat different. Generally, demographic data comprise such attributes as populations, scales, areas, etc. FIG. 3 shows an example of the content of geographic and demographic data. In the example shown in FIG. 3, for different POI types such as banks, universities and colleges, residential areas, office buildings, hotels, emporiums, supermarkets, shops, hospitals, restaurants, recreation facilities, companies and enterprises and factories, railway stations, coach terminals and bus stations, there are attributes such as branch type, operation duration, operation area, duration of universities and colleges, number of faculty, number of students, building duration, average building price, number of residents, sales area, rent, star level, number of rooms, number of employees, the registered capital of an enterprise, and vehicle number and amount, respectively. Of course, the checking apparatus 100 of the present invention does not require the demographic data to be checked to be identical to these attributes. Instead, preferably, the checking apparatus 100 of the present invention can be configured to check different demographic attribute data.

The enterprise is preferably one which has distributed branches in a city or other regions, thus the business data such as performance data of its branches being obtainable, or one whose business data corresponding to various subdivided geographic areas in a city or other regions can be obtained. For example, the enterprise is a bank having distributed business points in a city, and performance data can be obtained from each business point, the performance data related to the demographic condition in the geographic area where the business point is situated.

The business data of branches of enterprises can be of a plurality of different types. For example, for a bank, the business data of its branches may include the number of deposit accounts, overall deposit amount, intermediate business income and average daily trading amount, etc, which reflect its performance. Preferably, the span of time of the business data is half a year or one year so as to eliminate abnormal influences on the performance of bank branches by some accidental causes. FIG. 4 shows the performance data of the branches of a bank in 2006 (the name and some specific data of the branches are processed due to the consideration of confidentiality). Of course, the figure is only an illustration, not a limitation, of the present invention. For other enterprises of different types or the same types, the categories of the business data of their branches may be more, less or different than shown, and may also be used for checking the correctness of GIS data.

Referring again to FIG. 1, in an embodiment of the present invention, the checking apparatus 100 further includes a data formatter 108. The data formatter 108 can reside either within the data receiving module 101 as shown in FIG. 1, or outside the data receiving module 101.

The data formatter 108 is used for formatting the GIS data and enterprise business data received from the data receiving module 101 so as to facilitate the subsequent checking, that is, integrating the GIS data and the enterprise business data into a required data format so as to facilitate the subsequent analysis and calculation.

Figure 6:
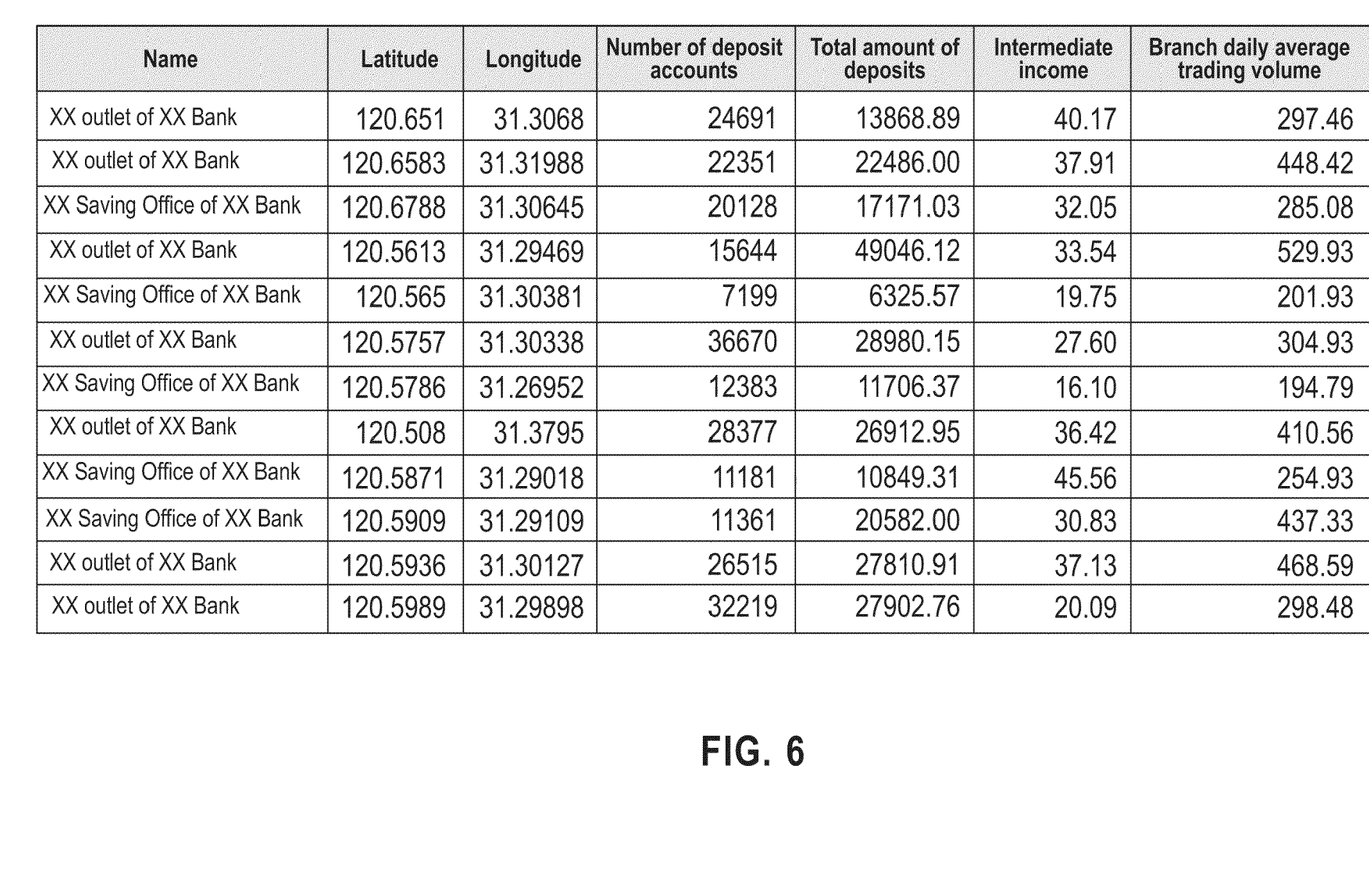
FIG. 6 shows an example of enterprise business data formatted by the data formatter according to an embodiment of the present invention.

The data formatter 108 organizes the GIS data by POI types, and for each POI type, selects relevant demographic attribute data that may have an impact on the enterprise business data from the GIS data, so as to check the relevant demographic attribute data using the enterprise business data. The data formatter 108 formats the business data of the enterprise branches into data of a GIS image layer, that is, adds the latitude and longitude of each enterprise branch to the business data of each enterprise branch, and selects relevant business data that can be used to check the accuracy of the GIS data from the business data. Preferably, it can be set and stored by a user which demographic attribute data of each POI type in the enterprise business data and which business data in the enterprise business data will be selected by the data formatter 108. FIG. 5 shows an example of the format of the GIS data formatted by the data formatter 108. As shown in the figure, the formatted GIS data have name, latitude and longitude, and have such demographic attributes as branch type, operation duration, operation area, duration of universities and colleges, number of faculty, number of students, building duration, building average price, number of inhabitants, sales area, rent, star level, number of rooms, number of stores, rating, number of employees, and registered capital, etc. according to different POI types. FIG. 6 shows an example of the enterprise business data formatted by the data formatter 108. As shown in the figure, the formatted enterprise business data has such data of a branch as the name, latitude and longitude, number of deposit accounts, total amount of deposits, intermediate business income and daily average trading volume.

Of course, the checking apparatus 100 of the present invention may also not include the data formatter 108, instead the checking module 102 can format the GIS data and enterprise business data from the data receiving module 101 before checking. For example, the GIS data feature extractor 104 and the business data feature extractor 105 in the checking module 102 format the GIS data and enterprise business data, respectively, before extracting the GIS data and enterprise business data, respectively. Alternatively, the data receiving module 101 could receive GIS data and enterprise business data conforming to corresponding formats. Thus the checking module 102 can directly check the GIS data according to the received enterprise business data.

The data receiving module 101 (or the data formatter 108) can store the received (or formatted) GIS data and enterprise business data into a database so that the checking module 102 can obtain the GIS data and enterprise business data from the database, and can also provide the GIS data and enterprise business data directly to the checking module 102.

In the embodiment shown in FIG. 1, the checking module 102 includes a geographic area determiner 103, a GIS data feature extractor 104, a business data feature extractor 105 and a checking engine 106. The containment and connection relationships among the checking module 102, geographic area determiner 103, GIS data feature extractor 104, business data feature extractor 105 and checking engine 106 can also be any one of a plurality of different relationships from those specifically shown in FIG. 1. For example, the geographic area determiner 103 can also reside outside the checking module 102, or the geographic area determiner 103, GIS data feature extractor 104, and business data feature extractor 105 can also be included in a separate module called a checking initialization module, or part of or all the functions of the GIS data feature extractor 104 and the business data feature extractor 105 can be included in the checking engine 106. All these and similar variations are within the scope of the present invention.

Figure 7:
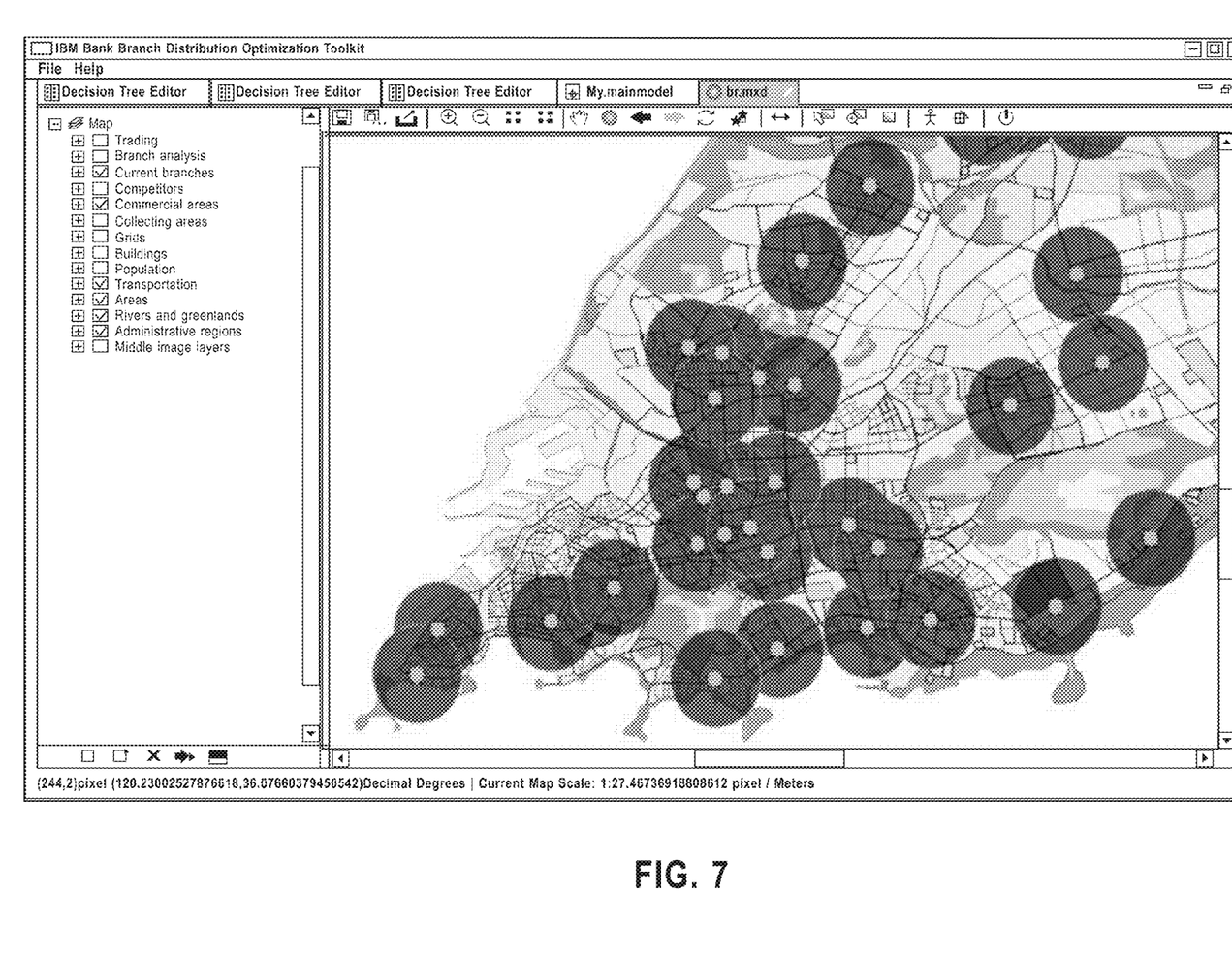
FIG. 7 shows an example of circular geographic areas with a radius of 1000 meters, determined by a geographic area determiner according to an embodiment of the present invention.

The geographic area determiner 103 is used for determining the geographic areas where the GIS data is to be checked, and to which the branch belong. That is, the geographic area determiner 103 creates geographic areas based on the positions of the branches, and the geographic and demographic data in each geographic area will be checked subsequently. Each geographic area takes the respective branch as the center, and can have various shapes such as circular and square shapes, preferably a circular shape. The smaller the geographic area is, the finer the checking will be. For a bank branch, the radius of a geographic area is generally between 500 meters and 1000 meters. FIG. 7 shows an example of circular geographic areas with a radius of 1000 meters, as determined by the geographic area determiner 103. The shape and size of the geographic area can be predefined and fixed in the checking apparatus 100 of the present invention, or can be set and stored by a user.

The GIS data feature extractor 104 is used for extracting GIS data features from the GIS data in the geographic area to which each enterprise branch belongs. Preferably, the GIS data features can reflect the geographic area's ability to contribute to the business volume of the branch.

In order to check GIS data, a numerical description of the data is needed, that is, to extract features therefrom. The GIS data features can be extracted using a plurality of methods as long as the extracted GIS data features can reflect the contribution of the POIs in the geographic area to the business volume of the corresponding enterprise branch.

In an embodiment of the present invention, the GIS data feature extractor 104 calculates a basic score of each POI based on relevant demographic attributes of the POI type in each geographic area where an enterprise branch is located, the basic score reflecting the contributing ability of the POI to the business volume of the enterprise branch; normalizes the basic score of each POI in each geographic area with respect to the basic scores of all POIs of a same type to obtain the final score of each POI; and, obtains the weighted sum of the final scores of all POIs in each geographic area according to the types they belong to, thus obtaining the total score of all POIs in each geographic area as the GIS data feature of each geographic area.

Specifically, only by way of example, a method for extracting a GIS data feature can be as follows.

A score (between 0 and 1) is provided for each POI, and its physical meaning is to describe the contribution level of the POI to the performance of the bank branch in a geographic area. This score can be calculated from the demographic data of the POI. The calculation methods for different POI types are different, but the basic concept is to first calculate a basic score based on such attributes as population or area, and then perform normalization among the same POI type to obtain a final score. An example of a method for calculating a POI score is given below.

For a XX bank branch (competitive branch), its basic score is the value of the operation area if the operation duration is longer than 3 years, and (operation area)*(operation duration)/3 if the operation duration is less than 3 years. After performing calculations on all XX bank branches to obtain their basic scores, these basic scores are normalized linearly to between 0 and 1 to obtain their final scores. If the smallest one of the basic scores is min and the biggest one is max, then the final normalized score for a certain branch with a basic score a is (a-min)/(max-min).

For a university or college, its basic score is 0.6*(the number of faculty)+0.4*(the number of students) if the duration of the university or college is longer than 3 years, and (0.6*(the number of faculty)+0.4*(the number of students))*(the duration of the university or college)/3 if the duration is less than 3 years. Afterwards, it is also normalized to obtain the final score.

For a residential area, its basic score is 0.4*(the normalized average building price)+0.6*(the normalized number of inhabitants) if the duration of the building longer than 3 years, and 0.5*(0.4*(the normalized average building price)+0.6*(the normalized number of inhabitants)). Afterwards, it is also normalized to obtain the final score.

Similarly, the final score of each POI is obtained.

It should be noted that the above mentioned method for calculating a POI score is only an illustration, not a limitation, of a calculation method usable with the present invention. The GIS data feature extractor 104 according to other embodiments of the present invention can calculate the basic score and final score of each type of POI using different demographic attributes and different calculating method for each type of POI. The demographic attributes for calculating a POI score, the specific calculation method and the parameters therein can be determined according to user experience, theoretical analysis or a sample training method, etc. In addition, although the final score of each POI is calculated using a linear normalization method in the above mentioned calculation method, the final score of each POI can be calculated using other kinds of normalization methods, such as nonlinear normalization, segmented normalization, etc., in the calculation methods according to other embodiments of the present invention.

After calculating the final score of each POI in each geographic area to which an enterprise branch belongs, the GIS data feature extractor 104 can further calculate the total score of all POIs in each geographic area as a GIS data feature reflecting the contribution ability of each geographic area to the business volume of the related branch. For example, the total score of all POIs in the geographic area can be calculated using the following method: first assigning a weight to each type of POI; then multiplying the score of each POI by the weight of the type to which the POI belongs to obtain a weighted score of the POI; and then obtaining the sum of the weighted scores of all POIs in the geographic area, which is the total score of all POIS in the geographic area. The physical meaning of the weight of each POI type is the contribution level of the type of POI to the performance of a bank branch. It should be noted that since the relationship between the subject bank and a POI of other banks is competitive, the weight of a bank POI should take a negative value. By taking as an example that the client bank is Industrial and Commercial Bank of China, a weight can be assigned to each type of POI according to Table 1.

For example, assuming that POIs in a certain geographic area include 3 residential areas, a branch of the Bank of China, a supermarket and 3 shops, and assuming that the final normalized scores of the POIs are as follows respectively: the final scores of the residential areas are 0.8, 0.7, 0.6, respectively; the final score of the branch of the Bank of China is 0.6; the final score of the supermarket is 0.5; and the final scores of the shops are 0.9, 0.3, 0.2, respectively, then according to the weights listed in Table 1, the total scores of all POIs in the geographic area is (0.8+0.7+0.6)*0.5+0.6*(−0.2)+0.5*0.1+ (0.9+0.3+0.2)*0.02=1.008.

TABLE 1

Exemplary weights of various types of POIs

| China Construction Bank | Bank of China | Agricultural Bank of China | Other commercial banks | University and college | Residential area | Office building | Hotel | Emporium |
|---|---|---|---|---|---|---|---|---|
| −0.2 | −0.2 | −0.2 | −0.1 | 0.5 | 0.5 | 0.3 | 0.05 | 0.3 |

| Supermarket | Shop | Hospital | Restaurant | Recreation facilities | Company, enterprise and factory | Railway station | Coach terminal | Bus station |
|---|---|---|---|---|---|---|---|---|
| 0.1 | 0.02 | 0.05 | 0.01 | 0.01 | 0.02 | 0.1 | 0.05 | 0.005 |

Of course, the specific numerical values of the weights listed in the above table are only an illustration instead of a limitation to the present invention. The checking apparatus 100 of the present invention can assign different weights to various types of POIs based on the different types of enterprises to which the enterprise business data for checking the correctness of GIS data belong and other factors. The weights can be determined according to user experience, theoretical analysis or a sample training method, and preferably can be set by users.

In another embodiment of the present invention, the GIS data feature extractor 104 is used for obtaining relevant demographic attributes of each type of POI in each geographic area from the GIS data in the geographic areas where the enterprise branches are situated, and summing the relevant demographic attributes of POIs of a same type in each geographic area, thus obtaining a vector composed of the total sum of the relevant demographic attributes of the various types of POIs in each geographic area as the GIS data feature of each geographic area. For example, a vector $x_i$ is obtained for ith geographic area (i=1,2 ... n) in n geographic areas, the vector being composed of the total sum of relevant demographic attributes of the various types of POIs in the geographic area, for example, $x_i$=(the total sum of households in residential areas, the total sum of average house prices of residential areas, the total sum of the numbers of faculties of universities and colleges, the total sum of the number of students of universities and colleges, the total sum of the attributes of other types of POIs ... ). In other embodiments of the present invention, the kinds and number of the demographic attributes contained in each vector can be different and preferably can be set by users.

The business data feature extractor 105 is used for extracting business data features that can reflect the business volumes of branches from the business data of the branches of an enterprise. That is, in order to utilize business data of branches such as performance data thereof, a numerical description needs to be given for the business data, i.e., a feature needs to be extracted. Here, a feature extracting method using normalized weighted sum is provided. For example, for a bank, the basic performance score of its branch can be calculated using the following method, as the business data feature of the branch: 0.3*(normalized number of deposit accounts)+0.3*(normalized total amount of deposits)+0.2*(normalized intermediate business income)+0.2* (normalized daily average business volume of the branch), wherein "0.3", "0.3", "0.2" and "0.2" are exemplary weights of different business data items (the normalization can use any normalization method as known by a person skilled in the art, such as linear normalization, non-linear normalization, segmented normalization, etc.). Optionally, after the basic performance score of each branch is calculated, it may be further normalized to be between 0-1, thus obtaining its final performance score, as the business data feature of the branch. Of course, other methods for calculating the basic performance score can be used. In other embodiments of the present invention, the business data feature extractor 105 may calculate the business data feature using other business data of an enterprise branch and other calculation methods and parameters. For example, in another embodiment of the present invention, the business data feature extractor 105 may directly extract relevant business data from the business data of each branch of an enterprise, as the business data feature reflecting the business volume of the branch, without performing normalization processing on the relevant business data.

The GIS data features (and intermediate results such as the basic scores and the final scores of POIs in various geographic areas) generated by the GIS data feature extractor 104 and the business data features of enterprise branches generated by the business data feature extractor 105 may be stored in a database for the subsequent checking process; or the generated GIS data features and business data features may be directly provided to the checking engine 106.

The checking engine 106 is used for determining whether the GIS data in the geographic areas to which the enterprise branches belong are correct based on a correlation model between the enterprise data features and the GIS data features.

In an embodiment of the present invention, the correlation model is an order consistence model between the GIS data features of geographic areas and the business data features of corresponding enterprise branches, and preferably the order consistence model is built in the checking engine 106. That is, the model is embodied in the operation of the checking engine 106. Thus, in this embodiment the model constructor 107 is not included. In the embodiment, the checking engine 106 is configured to perform the following operations: the enterprise branches are ordered according to the extracted business data features, thus obtaining a first order; the geographic areas to which the enterprise branches belong are ordered based on the extracted GIS data features, thus obtaining a second order; and it is determined whether the GIS data in a related geographic area are correct according to the consistence level between the first order and the second order.

Particularly, the checking engine 106 orders the enterprise branches according to the final performance score of each enterprise branch generated in the above process, orders the geographic areas according to the total scores of all POIs in each geographic area generated in the above process, and then compares the two ordering results. For any geographic area, the larger the difference between the ranking of the total score of the POIs and the ranking of the final performance score of the corresponding enterprise branch is, the more possibly the demographic data in the geographic area may have a problem, i.e., the larger the possibility that its demographic data are erroneous is. For example, if the ranking of the total performance score of the enterprise branch in a certain geographic area is 10, and the ranking of the total score of POIs in the geographic area is 16; the ranking of the total performance score of the enterprise branch in another geographic area is 30, and the ranking of the total score of POIs in the geographic area is 8; then it indicates the demographic data in the second geographic area may have a problem more possibly. Thus, the possibility that the demographic data in each geographic area may have errors can be obtained therefrom. By ordering the geographic areas based on the possibilities of having errors, the geographic and demographic data in a geographic area having a larger possibility of having errors will have problems more possibly, thus the correctness of the GIS data in each geographic area is determined.

In another alternative embodiment of the present invention, the checking apparatus 100 further comprises a model constructor 107 for constructing the correlation model. The model constructor can either reside, as shown in FIG. 1, outside the checking module 102, or be part of the checking module 102, or be part of the checking engine 106. The model constructor 107 can provide the constructed correlation model directly to the checking engine 106 so that the checking engine 106 can check the correctness of the GIS data based on the correlation model, or store the constructed correlation model to be used by the checking engine when necessary.

Preferably, the model constructor 107 constructs the correlation model by performing the following operations: obtaining the GIS data feature of the GIS data in a geographic area to which an enterprise branch belong, which GIS data feature has been known to be correct; obtaining the business data feature of the business data of the enterprise branch; and obtaining the parameters of the correlation model using the GIS data feature that has been known to be correct and the business data feature of the enterprise branches as training data, thus establishing the correlation model. The GIS data feature of the GIS data in a geographic area to which an enterprise branch belongs, which GIS data feature has been known to be correct, can be obtained using a plurality of methods. For example, correct GIS data in some geographic areas can be obtained by means of field survey, and the GIS data feature can be obtained therefrom using the above mentioned method. GIS data in some geographic area, which have been verified using other ways, can also be directly obtained, and the GIS data feature can be obtained therefrom.

Particularly, the model constructor 107 can construct the correlation model using a plurality of methods known in the art such as linear least square, neural network approximation etc. Hereinafter, only by way of example, the process of constructing a correlation model using the linear least square method will be described. Assuming that the GIS data in each geographic area i in n geographic areas can be described by a vector $X_i = (x_{i1}, x_{i2}, \ldots, x_{im})$ (i=1,2 ... n), where $x_{ij}$ is the total sum of the jth relevant demographic attribute (for example, a certain demographic attribute of a certain type of POI) in the ith geographic area; the performance of the enterprise branch in the ith geographic area can be described using a total sum or total score $y_i$ of business data. Then for the linear least square method, there is a model:

$$y_i = AX_i + b.$$

wherein A is a constant vector: $A = (a_1, a_2, a_m)$, where m is the number of components in $X_i$ (i.e., the number of image layers). If there is a certain amount of accurate training data, the values of A and b can be calculated using a method of least square estimation, thus obtaining the model $y_i = AX_i + b$. Thus when checking, if it is found, for example, that there exists a too large difference between the value of $Ax_2 + b$ and the value of $y_2$, then the GIS data in the second geographic area may be deemed to have a problem.

As another example, a method of neural network approximation can also be used. As above, assuming that the GIS data in each geographic area i in n geographic areas can be described by a vector $X_i = (x_{i1}, x_{i2}, \ldots, x_{im})$ (i=1,2 ... n), where $x_{ij}$ is the total sum of the jth relevant demographic attribute (for example, a certain demographic attribute of a certain type of POI) in the ith geographic area, and the performance of the enterprise branch in the ith geographic area can be described by a total sum or total score $y_i$ of business data, then the neural network can be regarded as a nonlinear function F with parameters. The input values of F are $x_1$, $x_2$ or $x_n$, the output values are $y_1$, $y_2$ or $y_n$. If there exist a certain amount of accurate training data, then the parameters of the function F can be calculated using a mature neural network training algorithm, thus obtaining the form of F. When checking, for example, if it is found that there exists a too large difference between the data of $F(x_2)$ and the value of $y_2$, then the GIS data in the second geographic area may be deemed to have a problem.

Figure 8:
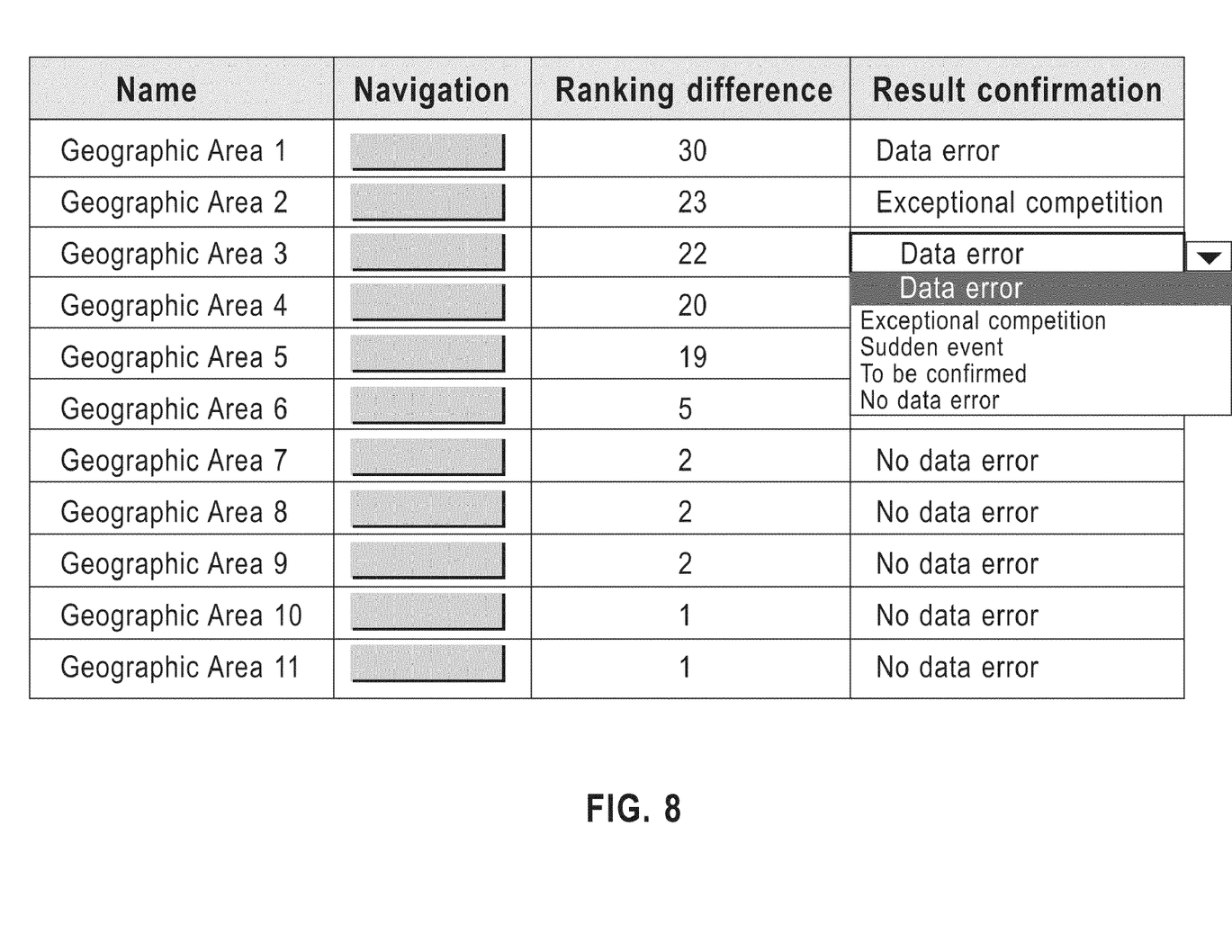
FIG. 8 shows an exemplary UI of a check result filter according to an embodiment of the present invention.

In a preferred embodiment of the present invention, the checking apparatus further comprises a checking result filter 109 for further determining and confirming manually by a user the checking results generated by the checking engine 106. Particularly, the checking result filter 109 may arrange the geographic areas in the order from large to small of the ranking differences, and provide navigation for the user to check the geographic information data in the geographic area. At the same time, it provides for the user to select and determine whether each geographic area has erroneous geographic information or has an exceptional competition or a sudden event, or is to be further confirmed, or has no data error. FIG. 8 shows an exemplary UI of the checking result filter 109.

In the foregoing the apparatus 100 for checking the correctness of GIS data according to an embodiment of the present invention has been described. The apparatus 100 is preferably integrated with an existing GIS system, but can also be a standalone apparatus. In other embodiments of the present invention, the apparatus 100 for checking the correctness of GIS data can have more, less or different modules, and the containment and connection relationships among the modules may be different. For example, in some embodiments of the present invention, there may be no model constructor 107 and/or data formatter 108 and/or checking result filter 109, and the data receiving module 101 can also be substituted with a separate GIS data receiving module and a separate business data receiving module.

Figure 9:
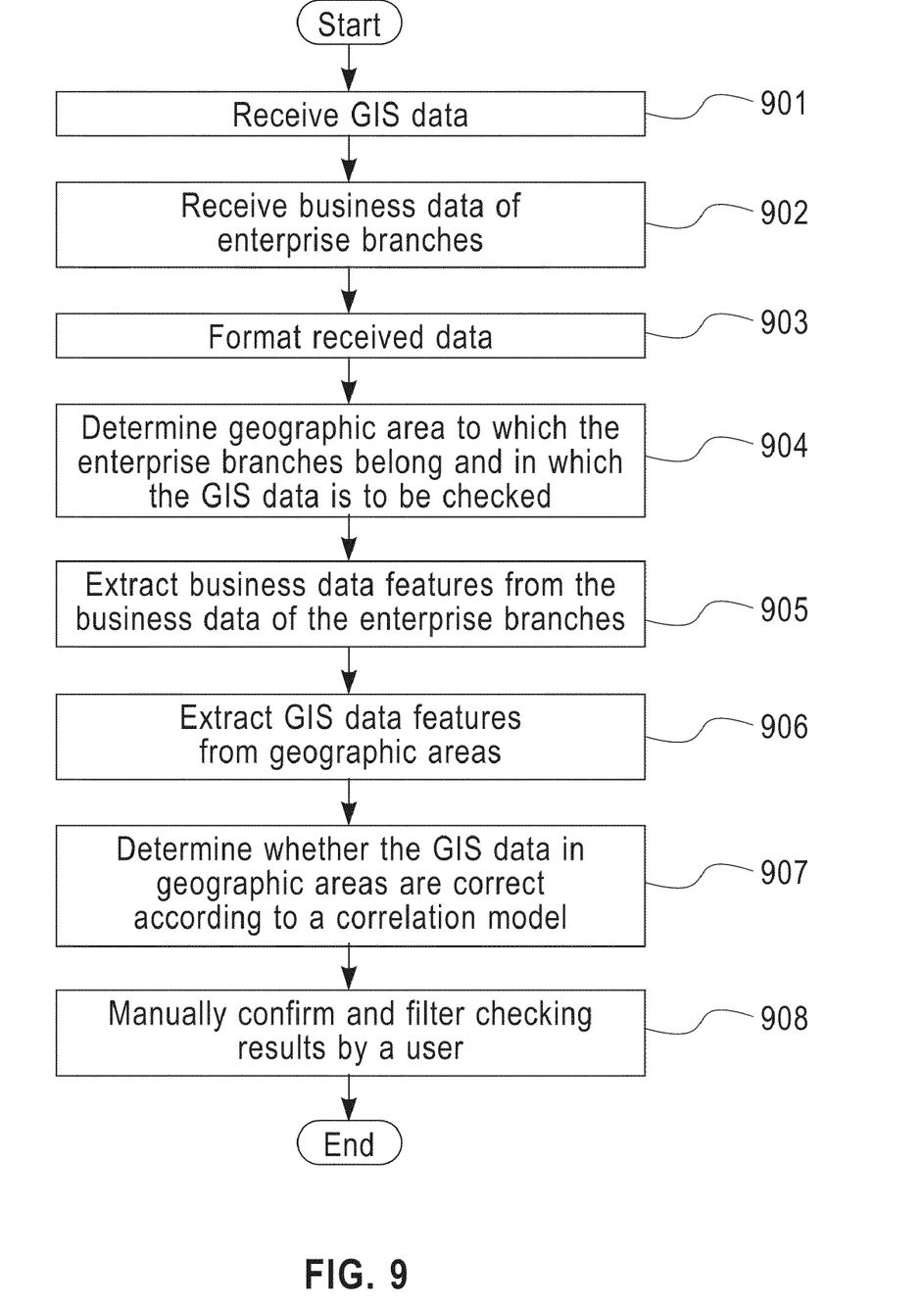
FIG. 9 shows a method for checking the correctness of GIS data according to an embodiment of the present invention.

A method for checking the correctness of GIS data according to an embodiment of the present invention will be described below with reference to FIG. 9. The method is preferably carried out by the apparatus 100 of the present invention as described above, but can also be carried out by other apparatus or systems. For simplicity, repetitive contents will be omitted in the following description. Thus a detailed understanding of the method of the present invention can be obtained with reference to the above description of the apparatus 100 of the present invention.

As shown in the figure, at step 901, GIS data are received.

At step 902, business data of enterprise branches are received.

At step 903, the received business data of enterprise branches and the received GIS data are formatted for subsequent checking. In some embodiments of the present invention, this step can be omitted.

At step 904, geographic areas to which the enterprise branches belong and in which the GIS data is to be checked are determined.

At step 905, business data features that can reflect the business volumes of the enterprise branches are extracted from the business data of the enterprise branches.

At step 906, from the GIS data in the geographic areas to which the enterprise branches belong, GIS data features that can reflect the contribution capability of the geographic areas to the business volumes of the enterprise branches are extracted.

In one embodiment of the present invention, the step 906 comprises the following sub-steps:

Calculating a basic score of each POI based on the relevant demographic attributes of each type of POIs in each geographic area where an enterprise branch is situated, the basic score reflecting the contribution capability of the POI to the business volume of the enterprise branch;

Normalizing the basic score of each POI in each geographic area with respect to the basic scores of all POIs of the same type, thus obtaining the final score of each POI; and Obtaining the weighted sum of the final scores of all POIs in each geographic area according to the types they belong to, thus obtaining the total score of all POIs in each geographic area as the GIS data feature of each geographic area.

In another embodiment of the present invention, step 906 includes the sub-steps of: obtaining relevant demographic attributes of the various types of POIs in each geographic area from the GIS data in the geographic areas where enterprise branches are situated; and summing up the relevant demographic attributes of the POIs of same types in each geographic area, thus obtaining a vector composed of the total sum of relevant demographic attributes of various types of POIs in each geographic area as the GIS data feature of each geographic area.

At step 907, it is determined whether the GIS data in the geographic areas where the enterprise branches are situated are correct based on a correlation model between the enterprise data features and the GIS data features.

In an embodiment of the present invention, the correlation model is an order consistence model between the GIS data features of geographic areas and the business data features of corresponding enterprise branches, and the step 907 includes the sub-steps of: ordering the enterprise branches according to the extracted business data features, thus obtaining a first order; ordering the geographic areas to which the enterprise branches belong according to the extracted GIS data features, thus obtaining a second order; and determining whether the GIS data in relevant geographic areas are correct based on the consistence level between the first order and the second order.

In another embodiment of the present invention, there is further a step of establishing the correlation model before step 907, and the step of establishing the correlation model includes the following sub-steps: obtaining the GIS data features of the GIS data in geographic areas to which enterprise branches belong, which GIS data have been known to be correct; obtaining the business data features of the business data of the enterprise branches; and obtaining the parameters of the correlation model using the GIS data features that have been known to be correct and the business data features of the enterprise branches as training data, thus establishing the correlation model.

At step 908, a user manually confirms and filters the checking results generated by the above checking process. In some embodiments of the present invention, the step 908 can be omitted.

Preferably, the GIS data comprises geographic data and demographic data.

In an embodiment of the present invention, the enterprise is a bank, and the geographic area to which each branch belongs is a circular geographic area with the branch as the center and the radius being 500-1000 meters.

In the foregoing a method for checking the correctness of GIS data according to an embodiment of the present invention has been described. It should be noted that the described and shown method is only an illustration instead of a limitation to the present invention. The method of the present invention can have more, less or different steps and the steps can have a different order therebetween or can be executed in parallel. For example, steps 901 and 902 as well as steps 905 and 906 may have a different order therebetween and/or can be executed in parallel.

The present invention can be implemented in hardware, software, or a combination thereof. The present invention can be implemented in a single computer system in a centralized manner or in a distributed manner, where different parts are distributed in several interconnected computer systems. Any computer system or other apparatus suitable for executing the methods described herein is applicable. Preferably the present invention is implemented in a combination of computer software and general computer hardware, where when a computer program is loaded and executed, it controls the computer system to execute the method of the present invention and constitute the apparatus of the present invention.

The present invention can also be embodied in a computer program product, which comprises all the features enabling the methods described herein to be implemented, and when being loaded into a computer system, can execute all the methods.

While the present invention has been shown and described with particular reference to preferred embodiments, a person skilled in the art will understand that the above and other various changes in form and detail can be made thereto without departing from the spirit and scope of the present invention as defined by the appended claims.

The invention claimed is:

1. A method for checking the correctness of GIS data, comprising the steps of:
receiving GIS data;
receiving business data of each branch of an enterprise;
determining a geographic area to which each branch belongs, wherein the GIS data in the geographic area will be checked; and,
checking whether the GIS data of the geographic area to which each branch belongs are correct based on the business data of each branch; and wherein the checking step further comprises the sub-steps of:
extracting business data features that can reflect the business transaction amounts of the enterprise branches from the business data of the enterprise branches;
extracting, from the GIS data in the geographic areas to which the enterprise branches belong, GIS data features that can reflect a contribution capability of the geographic areas to the business transaction amounts of the enterprise branches;
determining whether the GIS data in the geographic areas to which the enterprise branches belong are correct based on a correlation model between the business data features and the GIS data features,
calculating a basic score of each POI based on relevant demographic attributes of each type of POIs in each geographic area where an enterprise branch is situated, the basic score reflecting the contribution capability of the POI to the business transaction amounts of the enterprise branch,
normalizing the basic score of each POI in each geographic area with respect to the basic scores of all POIs of a same type, thus obtaining a final score of each POI, and
obtaining a weighted sum of each final score of all POIs in each geographic area based on the types they belong to, thus obtaining a total score of all POIs in each geographic area as the GIS data feature of each geographic area
wherein at least one of the steps is carried out using a computer device.

2. The method according to claim 1, wherein the step of extracting the GIS data further comprises the sub-steps of:
obtaining demographic attributes of POIs in each geographic area from the GIS data in the geographic areas where the enterprise branches are situated; and
summing the demographic attributes of POIs of same types in each geographic area, thus obtaining a vector composed of a total sum of the demographic attributes of POIs in each geographic area as the GIS data feature of each geographic area.

3. The method according to claim 2, wherein
the correlation model is an order consistence model between the GIS data features of geographic areas and the business data features of corresponding enterprise branches, and
the step of determining whether the GIS data in the geographic area to which the enterprise branches belong are correct based on a correlation model between the enterprise data features and the GIS data features further comprises the sub-steps of:
ordering the enterprise branches according to the extracted business data features, thus obtaining a first order;
ordering the geographic areas to which the enterprise branches belong according to the extracted GIS data features, thus obtaining a second order; and
determining whether the GIS data in relevant geographic areas are correct based on a consistence level between the first order and the second order.

4. The method according to claim 2, further comprising a step of establishing the correlation model, the step of establishing the correlation model comprising the sub-steps of:
obtaining GIS data features of the GIS data in geographic areas to which enterprise branches belong, which GIS data have been known to be correct;
obtaining business data features of the business data of the enterprise branches; and
obtaining parameters of the correlation model using the GIS data features that have been known to be correct and the business data features of the enterprise branches as training data, thus establishing the correlation model.

5. The method according to claim 1, further comprising, after the steps of receiving the business data of the branches and receiving the GIS data, a step of formatting the received business data of the branches and the received GIS data for the execution of the checking step.

6. The method according to claim 1, wherein the GIS data comprises geographic data and demographic data.

7. An apparatus for checking the correctness of GIS data, comprising:
a GIS data receiving unit configured to receive GIS data;
a business data receiving module configured to receive business data of each branch of an enterprise;
a geographic area determining unit configured to determine a geographic area to which each branch belongs, wherein the GIS data in the geographic area will be checked; and,
a checking unit configured to check whether the GIS data of the geographic area to which each branch belongs are correct based on the business data of each branch,
a business data extractor configured to extract business data features that can reflect the business transaction amounts of the enterprise branches from the business data of the enterprise branches,
a GIS data feature extractor configured to extract, from the GIS data in the geographic areas to which the enterprise branches belong, GIS data features that can reflect a contribution capability of the geographic areas to the business transaction amounts of the enterprise branches,
a checking engine configured to determine whether the GIS data in the geographic areas to which the enterprise branches belong are correct based on a correlation model between the business data features and the GIS data features,
calculate a basic score of each POI based on relevant demographic attributes of each type of POIs in each geographic area where an enterprise branch is situated, the basic score reflecting the contribution capability of the POI to the business transaction amounts of the enterprise branch;
normalize the basic score of each POI in each geographic area with respect to the basic scores of all POIs of a same type, thus obtaining a final score of the each POI; and
obtain a weighted sum of each of the final score of all POIs in each geographic area according to the types they belong to, thus obtaining the total score of all POIs in each geographic area as the GIS data feature of each geographic area, wherein at least one of the units is part of a computer device.

8. The apparatus according to claim 7, wherein the GIS data feature extractor is further configured to:

obtaining demographic attributes of POIs in each geographic area from the GIS data in the geographic areas where the enterprise branches are situated; and summing the demographic attributes of POIs of the same types in each geographic area, thus obtaining a vector composed of a total sum of the demographic attributes of POIs in each geographic area as the GIS data feature of each geographic area.

9. The apparatus according to claim 7, wherein, the correlation model is an order consistence model between the GIS data features of geographic areas and the business data features of corresponding enterprise branches, and the checking engine is configured to:

order the enterprise branches according to the extracted business data features, thus obtaining a first order;

order the geographic areas to which the enterprise branches belong according to the extracted GIS data features, thus obtaining a second order; and determine whether the GIS data in relevant geographic areas are correct based on a consistence level between the first order and the second order.

10. The apparatus according to claim 7, further comprising a model constructor for establishing the correlation model, the model constructor being configured to:

obtain the GIS data features of the GIS data in geographic areas to which enterprise branches belong, which GIS data have been known to be correct;

obtain the business data features of the business data of the enterprise branches; and obtain parameters of the correlation model using the GIS data features that have been known to be correct and the business data features of the enterprise branches as training data, thus establishing the correlation model.

11. The apparatus according to claim 7, further comprising a data formatter configured to format the business data of the branches and the GIS data received by the business data receiving module and the GIS data receiving module respectively for the checking unit to perform the checking.

12. The apparatus according to claim 7, wherein the GIS data comprises geographic data and demographic data.

13. An article of manufacture comprising a storage medium containing program instructions for causing a programmable data processing system to perform the method comprising the steps of:

receiving GIS data;

receiving business data of each branch of an enterprise;

determining a geographic area to which each branch belongs, wherein the GIS data in the geographic area will be checked; and, checking whether the GIS data of the geographic area to which each branch belongs are correct based on the business data of each branch; and wherein the checking step further comprises the sub-steps of:

extracting business data features that can reflect the business transaction amounts of the enterprise branches from the business data of the enterprise branches;

extracting, from the GIS data in the geographic areas to which the enterprise branches belong, GIS data features that can reflect a contribution capability of the geographic areas to the business transaction amounts of the enterprise branches;

determining whether the GIS data in the geographic areas to which the enterprise branches belong are correct based on a correlation model between the business data features and the GIS data features, calculating a basic score of each POI based on relevant demographic attributes of each type of POIs in each geographic area where an enterprise branch is situated, the basic score reflecting the contribution capability of the POI to the business transaction amounts of the enterprise branch, normalizing the basic score of each POI in each geographic area with respect to the basic scores of all POIs of a same type, thus obtaining a final score of each POI, and obtaining a weighted sum of each of the final score of all POIs in each geographic area based on the types they belong to, thus obtaining a total score of all POIs in each geographic area as the GIS data feature of each geographic area.

* * * * *